UNITED STATES PATENT OFFICE.

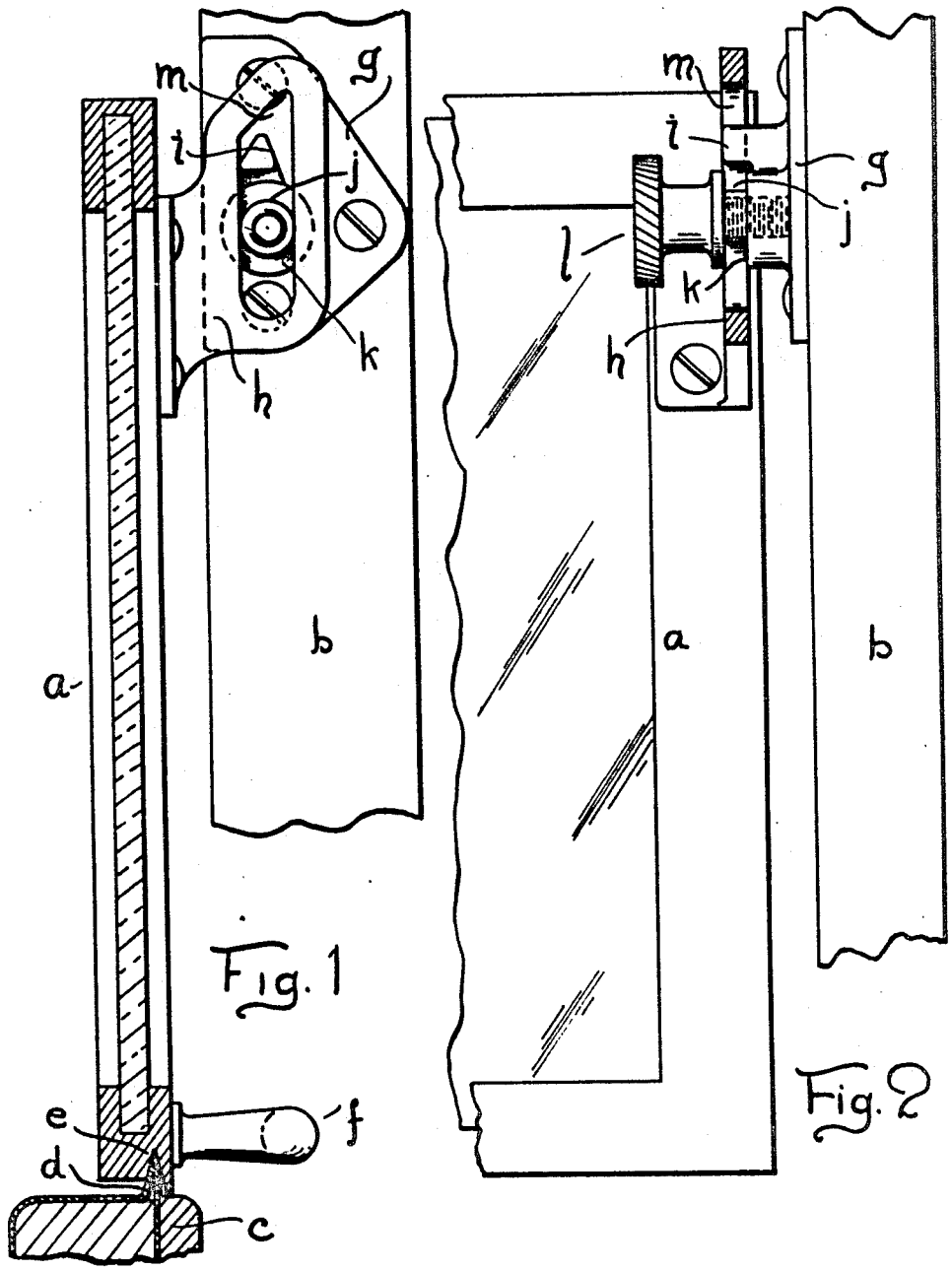

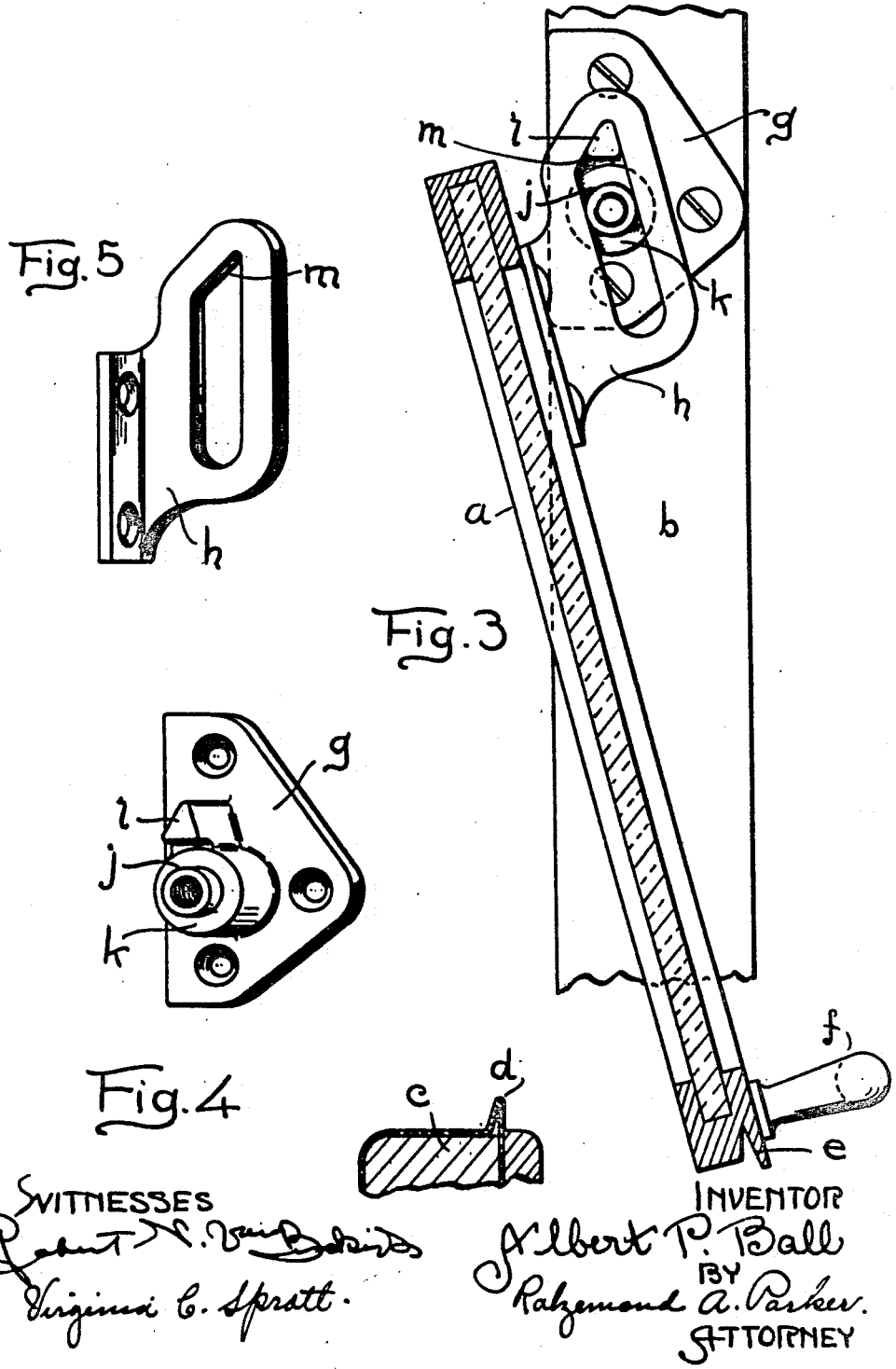

ALBERT P. BALL, OF DETROIT, MICHIGAN, ASSIGNOR OF ONE-HALF TO HUDSON MOTOR CAR COMPANY, A CORPORATION OF MICHIGAN, AND ONE-HALF TO DETROIT BODY CO., A CORPORATION OF MICHIGAN.

WIND-SHIELD PIVOT.

1,143,932.   Specification of Letters Patent.   Patented June 22, 1915.

Application filed October 14, 1914. Serial No. 866,569.

*To all whom it may concern:*

Be it known that I, ALBERT P. BALL, a citizen of the United States, residing at Detroit, county of Wayne, State of Michigan, have invented a certain new and useful Improvement in Wind-Shield Pivots, and declare the following to be a full, clear, and exact description of the same, such as will enable others skilled in the art to which it pertains to make and use the same, reference being had to the accompanying drawings, which form a part of this specification.

This invention relates to a wind shield pivot intended especially for use with closed bodies of automobiles.

In a closed body of a motor car, the driver's feet often become very hot by reason of the heat of the engines and it is therefore desirable to direct a current of air toward the feet of the occupants of the front seat. To accomplish this the wind shield is secured in a tilted position.

It is of course old to secure wind shields in a tilted position, especially upon open cars. There is, however, a difficulty experienced with closed bodies which is not present with open bodies, namely a weather-strip must needs be used upon the sill to support the wind shield so that a weather-tight and non-rattling fit can be had. This requires the lifting of the window off the weather strip or fence and makes the ordinary pivot for fastening a wind shield in various angular positions of no use in this connection.

This invention is designed to provide a pivot which will allow this lifting action and at the same time will securely fasten the wind shield in a tilted position for the purpose of directing a current of air upon the driver's feet.

In the drawings,—Figure 1, is a vertical section of the wind shield and the sill showing the pivot which is attached to the wind shield and the frame in elevation. Fig. 2, is an inside view of a portion of the wind shield and frame, showing the pivot in elevation, but with a portion broken away to show parts behind. Fig. 3, is a view similar to Fig. 1, showing the wind shield in open position. Fig. 4, is a perspective of one of the plates of the pivot. Fig. 5, is a perspective view of the other plate.

The wind shield is designated $a$, the frame in which the wind shield is located, $b$, and the bottom rail or sill of the frame $c$.

The sill is provided with a weather strip $d$ that fits into the groove $e$ in the lower sash bar of the wind shield.

$f$ indicates a handle by which the wind shield is manipulated.

In changing from the position of the wind shield shown in Fig. 1 to that shown in Fig. 3, it is necessary to lift it over the weather strip $d$. This is possible by reason of the following structure of the pivot. The pivot comprises two plates, the plate $g$ secured to the frame $b$ and the angle plate $h$ secured to the wind shield. The plate $g$ is provided with a prismatic stud $i$ and an integral, protruding bearing $j$ provided with a shoulder $k$. The bearing $j$ is hollow and screw threaded for the reception of the tightening screw $l$.

The angle plate $h$ comprises a portion which is screwed to the side bar of the wind shield and a slotted portion which might be referred to as an "O," for in shape it resembles an elongated letter O. This "O" fits over both the stud $i$ and the reduced portion of the bearing $j$, the shoulder $k$ holding it correctly positioned upon the reduced portion of the bearing $j$. The slot in the "O" permits the windshield to be lifted off from the weather strip $d$, the walls of the slot turning upon the cylindrical bearing $j$. The top of the slot has a defined angular shape to correspond with the angular relation of the two upper meeting sides of the prismatic stud $i$, that is to say, an acutely angular recess $m$ is provided at the upper rear side of the slot of the angle plate which corresponds to the angular relation of the two upper sides of the triangular stud $i$. Not only is there this correspondence of angles, but the angular recess $m$ of the slot is so positioned that when it rests over the stud $i$ the windshield will be held rearwardly of and away from the weather strip, as shown in Fig. 3, in which position it is open and calculated to direct the incoming currents of air toward the feet of the driver. When in this position the screw $l$ may be tightened against the angle plate $h$, thereby eliminating all rattling and securing the angle plate over the stud $i$.

A similar pivot is provided on the opposite side of the wind shield (not illustrated).

What I claim is:—

1. A pivot, comprising a plate provided with a bearing and a prismatic stud above the bearing and a second plate provided with a slot that fits over the bearing and also the stud, said slot being provided at its top with an angular recess, the angle of which corresponds to the top angle of the prismatic stud so that the walls of the angular recess are able to rest thereupon, and the angular recess being also located so as to hold the slotted plate in a defined tilt with respect to the other plate.

2. A pivot, having in combination a plate provided with a bearing, a prismatic stud above the bearing, a second plate having an "O"-like portion which fits over the bearing and the stud and the slot of the "O" being provided at its top with an angular recess whose angle corresponds to the angle of the two upper sides of the prismatic stud so that the walls of the angular slot can rest thereupon, the said angular recess also being located so as to tilt the one plate with respect to the other when the walls of the angular recess rest upon the stud.

3. A pivot, having in combination, a plate provided with a bearing having interior screw threads and with a prismatic stud above the bearing, a second plate provided with an "O"-like portion that fits over the bearing and the stud and which is provided at the top of the slot of the "O" with an angular recess whose angle corresponds with the angle of the two upper sides of the prismatic stud and whose angular recess is located with respect to the stud so that when the walls of the angular recess rest upon the stud the one plate is tilted with respect to the other plate, and a screw engaging the interior threads of the bearing to hold the two plates tightly together when in adjusted position.

4. A pivot having in combination, a plate adapted to be secured to a stationary frame and provided with a bearing having a reduced cylindrical portion forming a shoulder and a prismatic stud above the bearing, said bearing having interior screw threads, and an angle plate provided with an "O"-like portion which fits over the reduced portion of the bearing and the prismatic stud, the slot of the "O" being provided at its upper end with an angular recess, the angle of which corresponds to the angle of the two upper sides of the prismatic stud, the said angular recess being located with respect to the stud so as to hold the angle plate in a tilted position with respect to the other plate when the walls of the angular recess rest upon the prismatic stud, and a tightening screw engaging the threads of the bearing, substantially as described.

In testimony whereof, I sign this specification in the presence of two witnesses.

ALBERT P. BALL.

Witnesses:
MARIETTA E. RUDD,
VIRGINIA C. SPRATT.